UNITED STATES PATENT OFFICE.

GEORGES R. DE MONTLORD, OF BOSTON, MASSACHUSETTS, ASSIGNOR TO THE HYDLEATHER M'F'G. CO., OF NEW YORK, N. Y., A CORPORATION OF DELAWARE.

PROCESS OF MAKING PATENT-LEATHER OR ARTIFICIAL PATENT-LEATHER.

No. 928,235.     Specification of Letters Patent.     Patented July 13, 1909.

Application filed November 4, 1907. Serial No. 400,692.

*To all whom it may concern:*

Be it known that I, GEORGES R. DE MONTLORD, a citizen of the United States, residing in Boston, in the county of Suffolk and State of Massachusetts, have invented certain new and useful Improvements in Processes of Making Patent-Leather or Artificial Patent-Leather, of which the following is a specification.

This invention relates to an improved process of making patent-leather or artificial patent-leather; this artificial patent-leather having as a basis a special weave of cotton cloth.

The invention consists of an improved process of making patent-leather or artificial patent-leather by dissolving nitro-cellulose in a suitable solvent under addition of a vegetable oil, alcohol, glycerin, spirits of turpentine, and a pigment or dye-stuff; coating a plate either plate glass or aluminum plate with a composition with from three to five coatings as may be required, according to the thickness of either the cotton cloth or the leather to be transformed into artificial patent-leather or patent-leather; each separate coating so spread on the plate is dried by heat before applying the subsequent coating. When the coatings on the plate or glass are dry, the cotton cloth or leather is then cut in size to fit the plate or the glass on which it is then applied, after being immersed in pure ethyl acetate; the cotton cloth or leather is then spread on the already coated glass or plate, by means of heavy steel-rolls so that the solution in which the cotton cloth or leather are immersed and the coats on the glass or plate do adhere strongly together. The plate or glass is then dried with the cotton cloth or leather on it, and after drying the cotton cloth or leather is carefully removed with the coating and dried again. During the drying process no smell of any kind is noticeable.

When thick, heavy leather or cotton cloth is to be transformed into patent-leather or artificial patent-leather several surface coatings have to be applied to the plate or plate glass, preferably one at right angles to the other, so that a thicker coating finally adheres on it. The leather or cotton cloth saturated with ethyl acetate is then spread over the coated plate or glass-plate so as to cover the same and adhere thereto by submitting the plate and the leather or cloth to pressure, so that the solution with which the latter is impregnated, when pressed on the coats on the glass-plate cause the parts to adhere firmly to each other and permit the subsequent removal of the surface coat from the plate or plate-glass. The leather or cotton cloth which adheres to the plate or glass is then submitted to a drying process, and then carefully removed with the coating from the plate or plate-glass, the result being a smooth, glossy, pliable and non-crackable patent-leather or artificial patent-leather.

The following proportions have given good results, viz: 100 parts of ethyl acetate, aluminum salts, pyroxylin or a similar solution, 4 to 12 parts of nitro-cellulose, 2 parts of glycerin, C. P., 3 to 12 parts of castor oil or any other vegetable oil, 10 to 80 parts of pure alcohol from grain, 1 to 4 parts of spirits of turpentine, and the pigment or dyestuff which is thoroughly incorporated in the solution. The proportions, however, have to be varied somewhat according to the thickness of the hides and skins that are to be treated for making patent-leather, also for making artificial patent-leather when lighter or heavier cotton cloths are used.

The advantage of my improved patent-leather or artificial patent-leather is that the solution of ethyl acetate in which the leather or cotton cloth is immersed forms with the several coatings placed on the glass-plate one solid homogeneous body which adheres to the leather or cotton cloth in such a manner that not only it is not possible to produce cracks, but the coating cannot be removed without injuring or tearing the skin or cotton cloth. In the case of artificial patent-leather, in which the foundation is cotton cloth of different thicknesses the coating penetrates into the meshes and fibers of the fabric and forms one homogeneous solid body with the coating taken from the glass-plate, so that the immersed cotton cloth together with the coating on the plate cannot be separated from the coating without injuring the meshes and fibers of the fabric. The maximum proportion of vegetable oil for each coating on the plate or glass is, one per cent. for the first coating, four per cent. for the second coating, eight per cent. for the third coating, said percentages being based on one hundred parts forming the entire compound as above described.

My invention relates only to a patent finish process to be applied on cotton cloth or any kind of skins or hides.

In using the solution above described in different proportions according to the skins or hides treated, I have obtained patent leather that did not break, crack or become brittle, and said new article of manufacture was obtained on sheepskin, colt, cowhide, steerhide, bullhide, madras, goat, and kid, treated by me with the above process and solutions. The cotton cloth treated likewise has given brilliant and non-crackable patent-finish artificial leather.

Having thus described my invention, I claim as new and desire to secure by Letters Patent:

The process herein described of making patent-leather or imitation patent-leather, which consists in preparing a solution of nitro-cellulose, a solvent, a vegetable oil, alcohol, glycerin, spirits of turpentine, and a suitable pigment or dyestuff, immersing the leather or fabric into ethyl acetate, coating the surface of a glass-plate with one or more layers of the same solution, uniting the leather or fabric with the coatings on the glass-plate by pressure, then drying the leather or fabric while on the glass-plate, and finally removing the coated leather or fabric from the glass-plate.

In testimony, that I claim the foregoing as my invention, I have signed my name in presence of two subscribing witnesses.

GEORGES R. DE MONTLORD.

Witnesses:
L. F. MURPHY,
M. B. MAHONEY.